US011261986B2

United States Patent
Korczyński et al.

(10) Patent No.: US 11,261,986 B2
(45) Date of Patent: Mar. 1, 2022

(54) SERVO VALVE (71) Applicant: Hamilton Sundstrand Corporation, Charlotte, NC (US)

(72) Inventors: Marcin Korczyński, Wroclaw (PL); Wojciech Janiga, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 13 days.

(21) Appl. No.: 16/690,794

(22) Filed: Nov. 21, 2019

(65) Prior Publication Data
US 2020/0166152 A1   May 28, 2020

(30) Foreign Application Priority Data

Nov. 27, 2018   (EP) .................................... 18461632

(51) Int. Cl.
*F16K 11/07* (2006.01)
*F15B 13/04* (2006.01)
*F16K 31/00* (2006.01)
*F15B 13/043* (2006.01)

(52) U.S. Cl.
CPC ........ *F16K 31/008* (2013.01); *F15B 13/0435* (2013.01); *F16K 11/0708* (2013.01); *F16K 11/0716* (2013.01)

(58) Field of Classification Search
CPC .. F16K 31/008; F16K 11/0708; F16K 31/004; F15B 21/003; F15B 13/0435; F15B 13/0402; F15B 2013/041
See application file for complete search history.

(56) References Cited

U.S. PATENT DOCUMENTS

| 3,719,199 | A | * | 3/1973 | Mentink | F16K 11/0712 |
| | | | | | 137/269 |
| 6,034,466 | A | * | 3/2000 | Blanding | H02N 2/043 |
| | | | | | 310/328 |
| 2002/0148518 | A1 | * | 10/2002 | Lindler | F16K 31/008 |
| | | | | | 137/625.65 |
| 2003/0140974 | A1 | | 7/2003 | Suilmann et al. | |
| 2003/0221731 | A1 | * | 12/2003 | Ogura | F16K 27/041 |
| | | | | | 137/625.69 |
| 2009/0078112 | A1 | * | 3/2009 | Eschweiler | F15B 13/0402 |
| | | | | | 91/461 |
| 2010/0264348 | A1 | * | 10/2010 | Kinch | F15B 13/0407 |
| | | | | | 251/321 |
| 2012/0012768 | A1 | * | 1/2012 | Yahr | F16K 1/02 |
| | | | | | 251/129.11 |

(Continued)

FOREIGN PATENT DOCUMENTS

| KR | 20100115010 A | 10/2010 |
| WO | 8101035 A1 | 4/1981 |
| WO | 2015015154 A1 | 2/2015 |

OTHER PUBLICATIONS

European Search Report for Application No. 18461632.4, dated May 28, 2019, 8 pages.

*Primary Examiner* — Kelsey E Cary
(74) *Attorney, Agent, or Firm* — Cantor Colburn LLP (57) ABSTRACT

A servo valve comprises a valve housing, a cavity formed in the valve housing and a member disposed in the cavity and axially-moveable therein. The servo valve further comprises a piezoelectric actuator configured to axially move the member, relative to the valve housing, between first and second axial positions.

16 Claims, 5 Drawing Sheets

(56) References Cited

U.S. PATENT DOCUMENTS

| | | | |
|---|---|---|---|
| 2016/0153556 A1* | 6/2016 | Kenkel | F16K 11/06 |
| | | | 137/1 |
| 2017/0097100 A1* | 4/2017 | Patterson | E21B 34/16 |
| 2017/0227026 A1 | 8/2017 | Chaudhary et al. | |
| 2018/0003312 A1* | 1/2018 | Schupp | F16K 31/007 |

\* cited by examiner

SERVO VALVE

FOREIGN PRIORITY

This application claims priority to European Patent Application No. 18461632.4 filed Nov. 27, 2018, the entire contents of which is incorporated herein by reference.

TECHNICAL AREA

The present disclosure relates to servo valves, and in particular spool servo valves. Such spool valves are often used in hydraulic systems for aerospace applications.

BACKGROUND

Servo valves are well-known in the art and can be used to control the flow of fluid, for example hydraulic fluid to an actuator or fuel flow to a combustor. Typically, a flapper is deflected by an armature connected to an electric motor away or towards nozzles, which control fluid flow to the spool valve. Deflection of the flapper can control the amount of fluid injected from the nozzles, and thus the amount of fluid communicated to the actuator via the spool valve. In this way, servo valves can allow precise control of actuator movement.

SUMMARY

According to an aspect of the disclosure, there is provided a servo valve comprising: a valve housing; a cavity formed in the valve housing and defining a longitudinal axis; a member disposed in the cavity and axially-moveable therein, wherein the member comprises first and second sections having first and second cross-sectional areas, a central section located between the first and second sections and having a third cross-sectional area smaller than both the first and second cross-sectional areas, and first and second transition sections respectively between the first and second sections and the central section and forming respective first and second surfaces angled relative to the axis, wherein a channel is defined radially between the member and the valve housing, and bounded by the first and second sections, wherein the valve housing comprises a plurality of ports, each forming a fluid passage through the valve housing in fluid communication with the channel, the plurality of ports comprising first and second ports each defining a diameter and having first and second nozzles with first and second nozzle openings for providing fluid communication between the channel and a spool, the first and second nozzle openings each having diameters smaller than the diameter of their respective port, wherein, in a first axial position of the member the second nozzle opening is at least substantially obstructed by the second surface and the first nozzle opening is at least substantially unobstructed by the first surface, and in a second axial position of the member the first nozzle opening is at least substantially obstructed by the first surface and the second nozzle opening is at least substantially unobstructed by the second surface; and a piezoelectric actuator configured to move the member relative to the valve housing, between said first and second axial positions.

The piezoelectric actuator may be secured to the valve housing and secured to the member so as to actuate axial movement of the member relative to the valve housing.

The term 'secured' should be understood to mean that the two (or more) parts in question may be directly or indirectly secured together. When the two parts are indirectly secured together, one or more intervening members will be positioned therebetween.

In a further embodiment of any of the above, the piezoelectric actuator comprises a piezoelectric stack and a frame, wherein the piezoelectric stack is attached to the frame at a first pair of opposed attachment points arranged perpendicular to the axis, and the member and the valve housing are attached to the frame at a second pair of opposed attachment points.

In a further embodiment of any of the above, the actuator is arranged outside the valve housing and secured to the valve housing at an axial end thereof by a bracket.

A further embodiment of any of the above further comprises a cover secured to the valve housing and comprising an axially-extending portion extending axially beyond the piezoelectric actuator and a radially-extending portion.

A further embodiment of any of the above further comprises: an electrical connection extending from the piezoelectric actuator and through an opening in the cover, the electrical connection configured for connection to an external power source; and a seal disposed proximate the opening to sealingly engage the electrical connection and the cover.

In a further embodiment of any of the above, the cavity defines a cross-section with a constant radial size and the first and second sections of the member are slideably engaged to the valve housing within the cavity.

In a further embodiment of any of the above, the cavity cross-section and the first and second cross-sectional areas of the first and second sections are circular.

A further embodiment of any of the above further comprises an O-ring seal disposed around the second section of the member to sealingly engage the member and the valve housing.

In a further embodiment of any of the above, one or more of the ports comprises a screen filter.

In a further embodiment of any of the above, the valve is a fuel supply valve.

In an further embodiment of any of the above, the valve is a pneumatic control valve.

In a further embodiment of any of the above, the plurality of ports extend substantially perpendicularly to the longitudinal axis.

In a further embodiment of any of the above, the plurality of ports extend substantially parallel to each other.

In a further embodiment of any of the above, the plurality of ports comprises a third port located axially between the first and second ports.

A further embodiment of any of the above further comprises a spool in fluid communication with at least one of the plurality of ports for controlling fluid flow to a component.

According to a further aspect of the disclosure, there is an assembly comprising the servo valve of the above embodiment; and a component in fluid communication with the spool.

According to a further aspect of the disclosure, there is a method of repairing a valve system comprising: removing an existing servo valve; fitting the servo valve of any of the above embodiments.

DETAILED DESCRIPTION OF THE FIGURES

Figure 1:
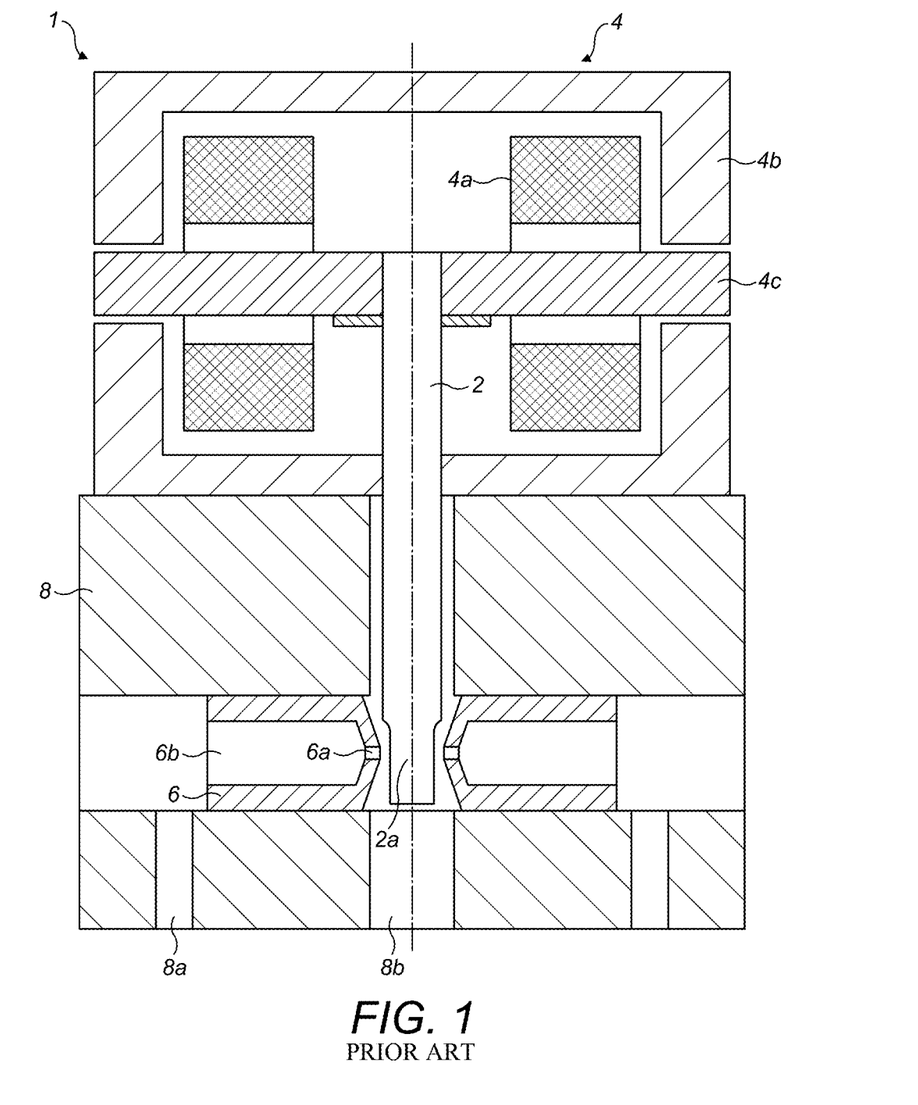
FIG. 1 shows a prior art servo valve.

With reference to FIG. 1, a prior art servo valve 1 is illustrated. Servo valve 1 comprises an electric motor 4, flapper 2, nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to create movement of armature 4c, as is well-known in the art. Flapper 2 is attached to armature 4c, and is deflected by movement of the armature 4c. Nozzles 6 are housed within nozzle housing 8 via an interference fit and comprise a fluid outlet 6a and fluid inlet 6b. Housing 8 also has a port 8a, which allows communication of fluid to the nozzles 6.

The flapper 2 comprises a blocking element 2a at an end thereof which interacts with fluid outlets 6a of nozzles 6 to provide metering of fluid from the fluid outlets 6a to a fluid port 8b in the housing 8, which allows communication of metered fluid from the nozzles 6 to an actuator via a spool valve input (not shown). As is known in the art, the electric motor 4 is used to control deflection of the blocking element 2a and vary the fluid delivered to the actuator from nozzles 6, as required.

Figure 2:
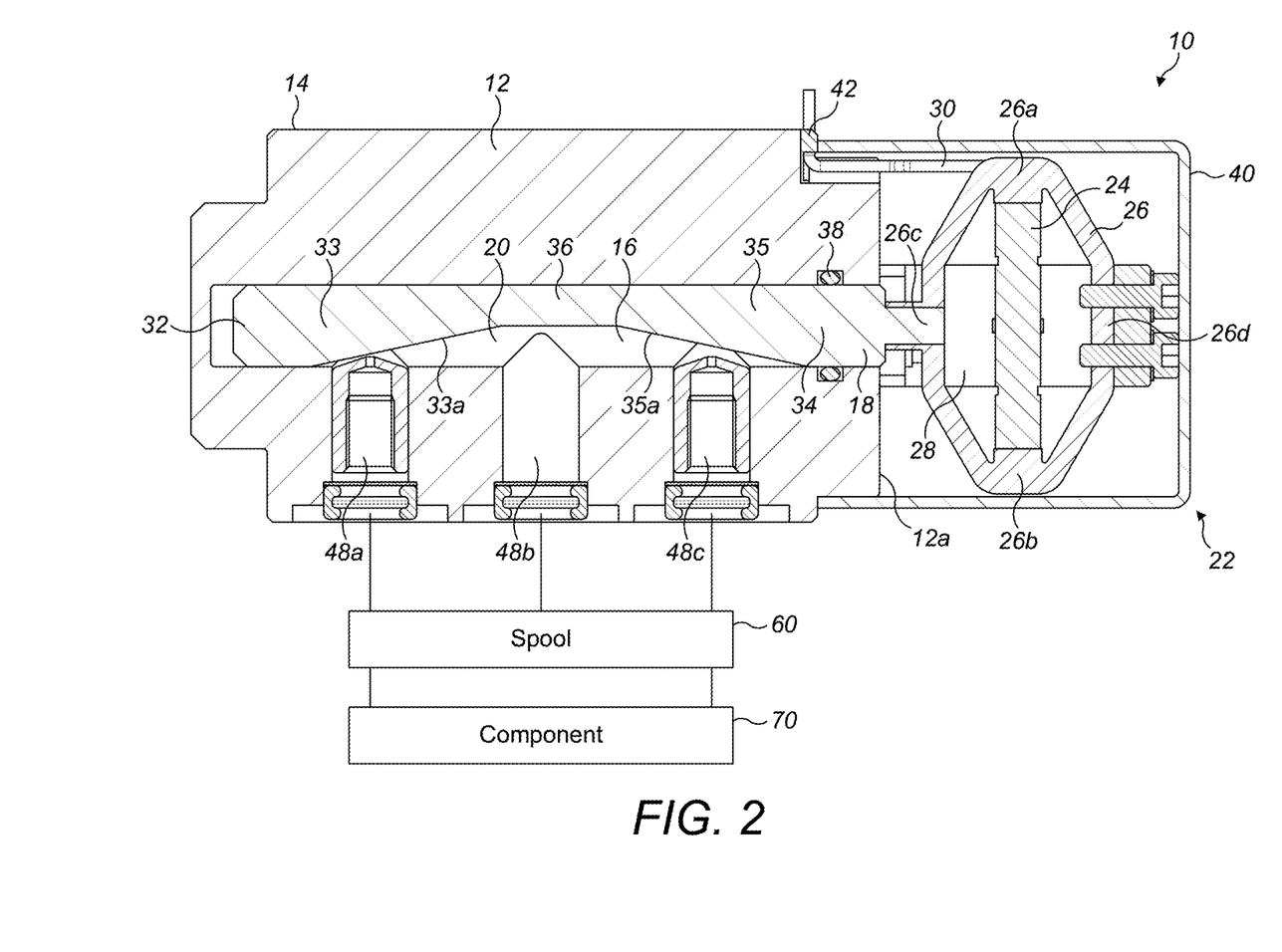
FIG. 2 shows a cutaway view of a servo valve assembly in accordance with the present disclosure.
Figure 3:
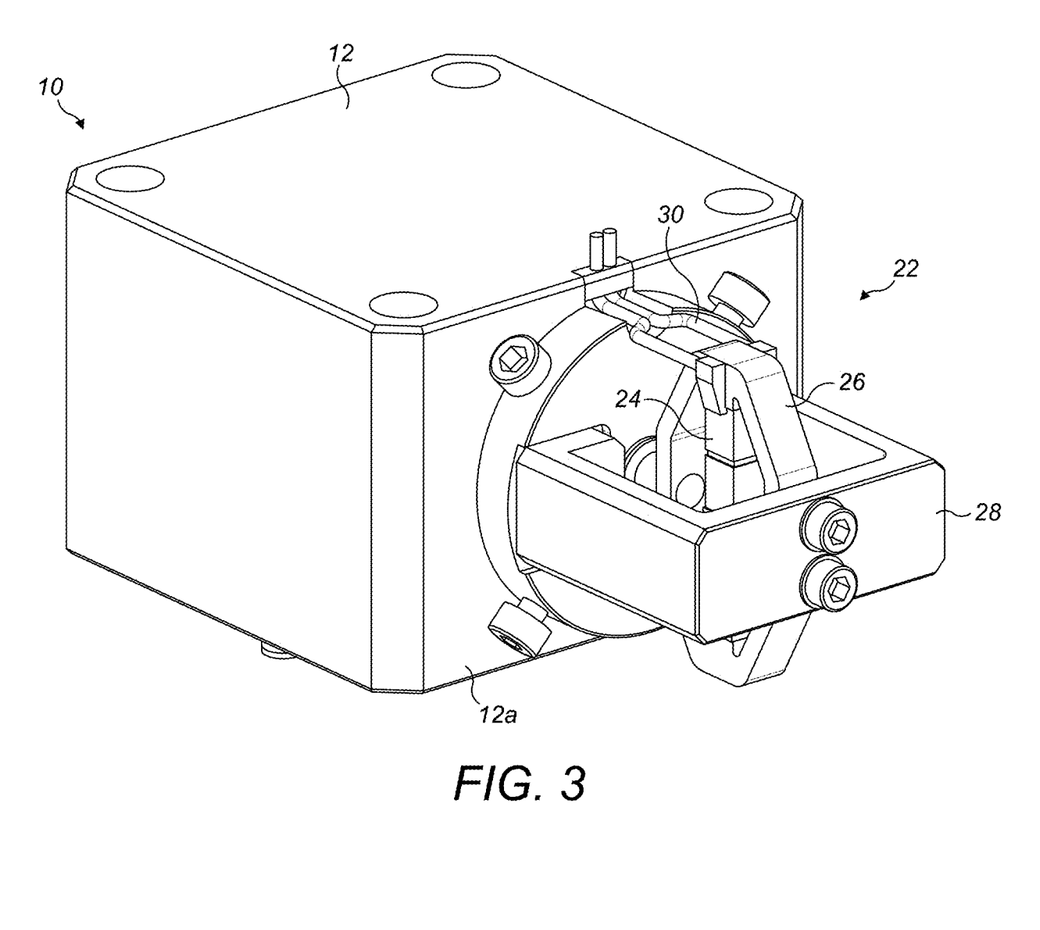
FIG. 3 shows a perspective view of the servo valve of FIG. 2.

FIGS. 2 to 5 illustrate a servo valve 10 in accordance with the present disclosure. FIG. 2 also shows, in a schematic manner, a spool 60 driveably connected to the servo valve 10 and a component 70 controlled by the position of the spool 60. The component 70 may be an actuator.

The valve comprises a valve housing 12 with an outer surface 14 and a cavity 16, the cavity 16 defining a longitudinal axis X through the valve housing 12. The valve housing 12 has first and second axial ends 12a, 12b, and the cavity 16 forms an opening 16a in the outer surface 14 at the first axial end 12a.

An elongated member (or 'rod') 18 is disposed predominantly in the cavity 16, extending along the axis X. The member 18 is shaped so as to form a channel 20 in the cavity 16, as will be described in further detail below.

Figure 4:
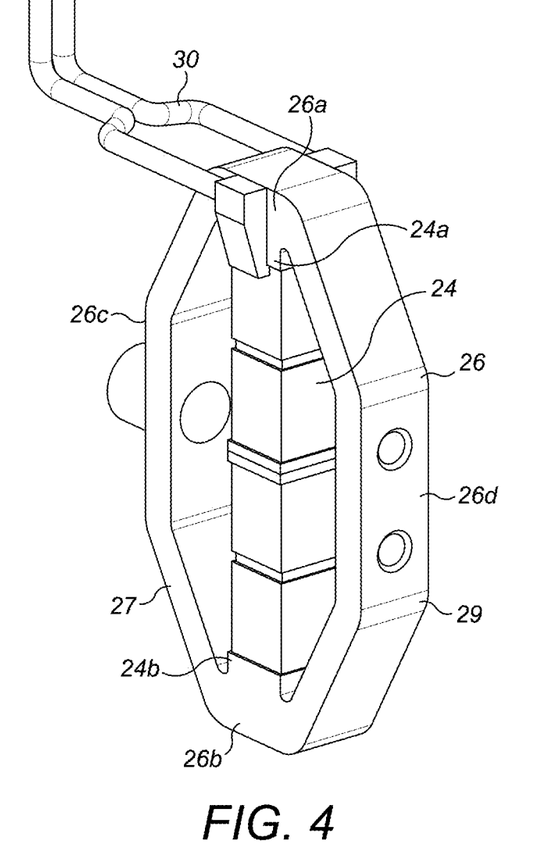
FIG. 4 shows an isolated perspective view of a piezoelectric actuator portion of the servo valve of FIG. 2.

A piezoelectric actuator 22 is secured to the outer surface 14 of the valve housing 12 at the first end 12a by a bracket 28. The piezoelectric actuator 22 is also secured to an end 18a of the member 18. In the embodiment shown, the piezoelectric actuator 22 comprises a piezoelectric stack 24 and a frame 26, as best seen in FIG. 4. An electrical connection 30 connects the piezoelectric stack 24 to an electrical power source (not shown).

The frame 26 comprises a plurality of attachment points 26a-d for other components. In the embodiment shown, the attachment points forms sides of a generally octagonal frame; however, it is to be understood that the attachment points could instead be on vertices of a quadrangular frame without affecting the general function of the frame.

The piezoelectric stack 24 is arranged within the frame 26, generally perpendicular to the longitudinal axis X. A pair of ends 24a, 24b of the piezoelectric stack 24 are fixed to the frame 26 at a first pair of attachment points 26a, 26b forming sides of the frame 26. The first pair of attachment points 26a, 26b are opposing sides of the frame 26, arranged generally in line with each other in a direction perpendicular to the axis X.

A second pair of attachment points 26c, 26d form a second pair of opposing sides of the frame 26. The second pair of attachment points 26c, 26d are arranged generally in line with each other in the direction of the axis X. One of the second pair of attachment points 26c fixedly attaches the frame 26 to the end 18a of the member 18, thereby securing the actuator 22 to the member 18. The other of the second pair of attachment points 26d fixedly attaches the frame 26 to the bracket 28, thereby securing the actuator 22 to the valve housing 12.

The attachment points 26a-d are connected to each other via four connecting sides 27a-d of the frame. Each of the sides of the frame 28 are joined to adjacent sides at flexible joints 29 which allow relative angular movement of the adjacent sides.

The attachments between respective components and sides may be by any known means. For example, the frame 26 is connected to the bracket 28 by a pair of washer and screw connections. The frame 26 may be attached to the end 18a of the member 18 by soldering or by gluing, for example.

The piezoelectric stack 24 is formed of a known piezoelectric material. An electric signal is provided to the stack 24 from the power source via the connection 30. The electrical signal results in a change of dimension, either an expansion or contraction, of the stack 24 in the direction perpendicular to the longitudinal axis X in which the stack 24 is arranged.

Any type of material exhibiting piezoelectric behaviour might be used to form the piezoelectric stack 24, for example synthetic crystals such as langasite, gallium orthophosphate, lithium niobate or lithium tantalite; or synthetic ceramics such as barium titanate, lead zirconate titanate, potassium niobate, sodium tunstate or zinc oxide. Synthetic ceramics may be used in particular to provide resistance to high temperatures, such as those frequently encountered in aerospace applications.

As the ends 24a, 24b of the stack 24 are attached to the first pair of sides 26a, 26b of the frame 26, the movement of the stack 24 produces a corresponding relative movement of the first pair of sides 26a, 26b either contracting towards or expanding apart from each other. As adjacent ones of the sides are joined at flexible joints, movement of the first pair of sides 26a, 26b results in a distortion of the frame 28. Hence, expansion of the first pair of sides 26a, 26b results in a contraction of the second pair of sides 26c, 26d along the axis X, and a contraction of the first pair of sides 26a, 26b similarly results in an expansion of the second pair of sides 26c, 26d along the axis X.

As the second pair of sides 26c, 26d are secured to the member 18 and housing 12, a relative expansion or contraction of the second pair of sides 26c, 26d in turn results in relative movement of the member 18 within the housing 12. Hence, it can be seen that applying an electrical signal to the piezoelectric stack 24 allows the actuator 22 to control an axial displacement of the member 18 in the cavity 16 of the housing 12.

The expansion and contraction of the piezoelectric stack 24 is proportional to the voltage/current applied thereto. Hence, the electrical signal can precisely control the change in dimensions of the piezoelectric stack 24, and thereby the degree of movement of the member 18 within the cavity 16.

A generally elliptical shape formed by the frame arrangement can provide an amplification of the displacement of the piezoelectric stack 24, increasing the movement experienced by the member 18 at a given electric signal. That is, the structural arrangement of the frame 26 is such that a given displacement of the piezoelectric stack 24 results in a larger displacement of the member 18, due to the separation between the first pair of attachment points 26*a*, 26*b* being greater than the separation between the second pair of attachment points 26*c*, 26*d*. The amplification effect is increased by increasing the ratio between separation of the first pair of sides 26*a*, 26*b* relative to the separation of the second pair of sides 26*c*, 26*d* (as measured in an un-electrified state of the piezoelectric stack 24). The amplification ratio of the frame 26, measured as the ratio of member displacement to piezoelectric displacement can be between 2 to 20, for example 10.

The member 18 inside the cavity 16 comprises notional first and second end sections 32, 34, and a third, middle section 36 arranged between the first and second end sections 32, 34. The first and second end sections 32, 34 have first and second cross-sectional areas, which are generally constant along the longitudinal axis X. In the embodiment shown, the first and second cross-sectional areas are the same size and shape, for example circular. The third section 36 has a third cross-sectional area, also generally constant along the axis X, in this example, roughly semi-circular (with the partially circumferential surface adjacent the inner surface of the valve housing 12). The third cross-sectional area is smaller than both of the first and second cross-sectional areas.

The first and second sections 32, 34 are connected to the third section by respective transition sections 33, 35, which have cross-sectional areas which vary along the axis X (for example, linearly) from the first or second cross-sectional areas adjacent the first or second section 32, 34 to the third cross-sectional area adjacent the third section 36. The transition sections 33, 35 thereby form first and second sloped or angled surfaces 33*a*, 35*a* on the member 18 which are non-parallel with the axis X.

The cavity 16 has a cross-sectional size only slightly larger than that of the first and second cross-sectional areas, and is correspondingly shaped to the first and second sections 32, 34. The member 18 therefore has a sliding, sealing fit within the cavity 16. The reduced cross-sectional area in the third section 36 therefore forms a channel 20 within the cavity 16, bounded by the seals formed by the first and second end sections 32, 34. In the embodiment shown, the channel 20 is a generally trapezoidal cutaway shape, defined by the inner surface of the valve housing 12, the sloped surfaces 33*a*, 35*b* and a surface 36*a* of the third section 36.

Figure 5:
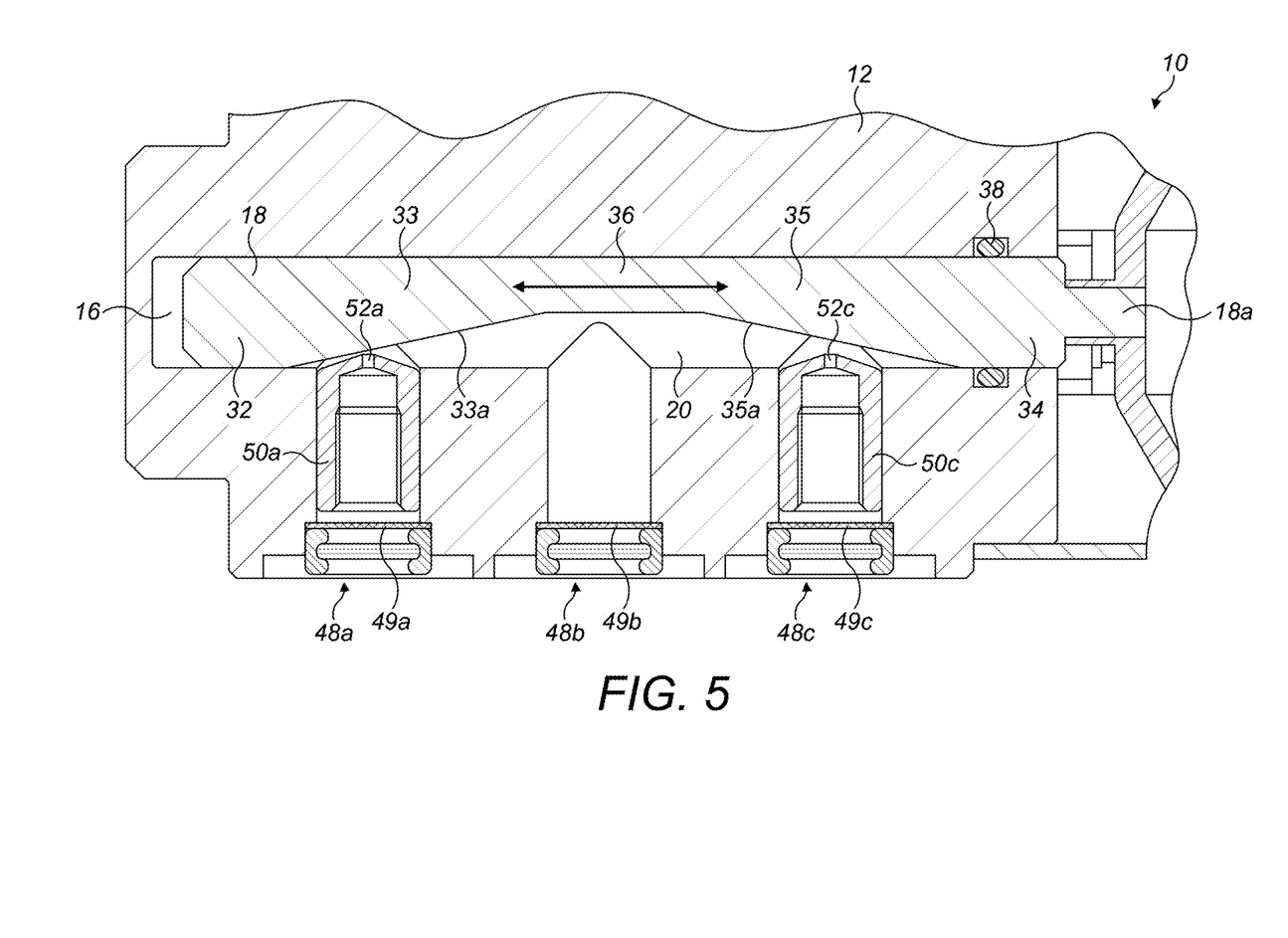
FIG. 5 shows a cutaway view of a portion of the servo valve of FIG. 2.

As best seen in FIG. 5, ports 48A, 48B, 48C are formed in the valve housing 12 and extend fully between the outer surface 14 of the valve housing 12 and the cavity 16. The ports 48A, 48B, 48C thereby provide a means of fluid communication into the valve housing 12 from the outer surface 14 to the cavity 16. Respective openings of the ports 48A, 48B, 48C are located in the cavity 16.

The member 18 is situated in the cavity 16 such that the openings of the ports 48A, 48B, 48C are located axially between the first and second sections 32, 34 of the member 18. The openings of the ports 48A, 48B, 48C are therefore in fluid communication with the channel 20 formed by the member 18.

The ports comprise a supply port 48A, a control port 48B and a return port 48C. The supply port 48A is linked to a supply of fluid (not shown) to communicate fluid from the supply to the channel 20. The control port 48B is linked to a downstream component, to communicate fluid from the annular channel to the downstream component. The return port 48C operates to return fluid to a supply or atmosphere.

The supply port 48A and the return port 48C comprise respective nozzles 50A, 50C, having respective nozzle openings 52A, 52C. In the first axial position of the member 18 (not shown), the return port nozzle opening 52C is proximate the second sloped surface 35*a*, which substantially or fully obstructs the nozzle opening 52C. The engagement may fluidly seal the nozzle opening 52C. In the first axial position, the supply port nozzle opening 52A is substantially or fully unobstructed, because the first sloped surface 33*a* is axially spaced from the supply port nozzle opening 52A in a direction away from the return port nozzle opening 52C.

As the member 18 is moved from the first axial position partially towards the second axial position (shown in FIGS. 2 and 5) by the actuator 22 as described above, the second sloped surface 35*a* moves axially relative to the return port nozzle opening 52C, such that the second sloped surface 35*a* is further from the return port nozzle opening 52C in a direction away from the supply port nozzle opening 52A, and only partially obstructs the return port nozzle opening 52C, obstructing the return port nozzle opening 52C to a lesser extent than in the first axial position. As such, a partial fluid flow is allowed through the nozzle opening 52C, although the fluid flow is less than if the nozzle opening 52C were substantially or fully unobstructed.

At the same time, the first sloped surface 33*a* partially engages the supply port nozzle opening 52A in a similar manner as described above, preventing some of the fluid flow therethrough.

As the member 18 moves further from the first axial position fully towards the second axial position, the second sloped surface 35*a* moves further from the return port nozzle opening 52C such that fluid may flow through substantially or fully unobstructed. At the second axial position, the first sloped surface 33*a* is proximate the supply port nozzle opening 52A and substantially or fully prevents any fluid flow therethrough.

The control port 48B is at least substantially unobstructed independent of the axial position of the member 26.

The operation described above allows the control of fluid through the respective ports 48A, 48B, 48C by controlling an axial position of the member 18 using the piezoelectric actuator 22. As described above, the member 18 can be moved, in a continuous manner, to any axial position between the first and second axial positions; hence, fluid flow through the ports 48A, 48B, 48C can be controlled to provide partial flow through the supply and/or return ports 48A, 48C.

The described valve provides a means for selectively controlling fluid flow using a desirably simplified construction. For example, a one-piece member may be used to reduce the connections required between parts.

The simple construction of the present disclosure also reduces the need to cut air gaps between components.

The member 18 of the present arrangement fulfils the role of the flapper of the prior-art valve; however, by comparison, the member 18 of the present valve 10 requires relatively little calibration.

The use of a piezoelectric actuator 22 fulfils both the function of fixing the member 18 in place relative to the housing 12, and of moving the member 18. Additionally, the piezoelectric actuator 22 provides bidirectional axial movement with a single component, as opposed to more complex prior art arrangements using a pair of magnets or co-operational arrangement of magnets and springs. Finally, the use of a piezoelectric actuator 22 removes the need for permanent or solenoid magnetisation, as in said prior art arrangements.

It may be desirable to more effectively seal the annular channel 31 formed by the member 26 to prevent any fluid encroachment through the cavity openings 16a, 16b. As described above, this might be partially achieved by matching the size of sections 32, 34 with a size of the cavity 16. However, an O-ring seal 38 might also be provided on the side of the channel 20 nearest the open axial end 12a of the valve housing, sealingly engaging the member 18 at the second section 34 with the surrounding valve housing 12 and thereby providing additional sealing of the channel 20. Sealing prevents fluid encroachment out of the cavity 16, and additionally prevents undesirable entry of contaminants into the interior of the valve 10. However, the sealing provided by the size-matching of the member 18 and cavity 16, and/or by the O-ring seal 38, does not prevent contamination of the exterior piezoelectric actuator 22.

To this end, a cover 40 may be provided at the axial end 12a of the valve housing 12 at which the actuator 22 is disposed. The cover 40 forms a 'bucket' shape, having an open end, an axially-extending component 40a and a radially-extending component 40b providing a closed end opposite the first end. The axially-extending component 40a extends from the axial end 12a of the valve housing 12, to a point axially beyond the extent of the actuator 22. The radially-extending portion 40b is located at said point so that the second cover 40 encompasses the actuator 22.

It may be necessary for the electrical connection 30 to extend through an opening in the cover 40 to connect the piezoelectric stack 24 to the electrical power source, if externally disposed. A seal 44, for example a rubber seal, may be provided around the electrical connection so as to prevent contamination through the opening 42. The cover 40 may be secured to the valve housing 12 by any known means, for example by a nut and bolt connection as shown.

The ports 48A, 48B, 48C may be provided with respective screen filters 49A, 49B, 49C to help prevent contaminants from entry into the valve 10 via any of the ports.

In an embodiment, the above-described valve 10 may be used as part of a fuel-metering system, where the fluid passing through the valve is a fuel, the supply is a fuel supply, and the downstream component 70 is a part of an engine requiring fuel.

In an alternative embodiment, the above-described valve 10 may be part of a pneumatic system, where the fluid passing through the valve is air, the supply is an air supply, and the downstream component 70 is a pneumatic actuator.

The valve 10 may be provided as part of an engine for an aircraft, or in an aircraft control surface, for example.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A servo valve comprising:
a valve housing;
a cavity formed in the valve housing and defining a longitudinal axis (X);
a member disposed in the cavity and axially-moveable therein, wherein the member comprises:
first and second sections having first and second cross-sectional areas;
a central section located between the first and second sections and having a third cross-sectional area smaller than both the first and second cross-sectional areas; and
first and second transition sections respectively between the first and second sections and the central section and forming respective first and second surfaces angled relative to the axis (X), wherein a channel is defined radially between the member and the valve housing, and bounded by the first and second sections,
wherein the valve housing comprises:
a plurality of ports, each forming a fluid passage through the valve housing in fluid communication with the channel, the plurality of ports comprising:
first and second ports each defining a diameter and having first and second nozzles with first and second nozzle openings for providing fluid communication, the first and second nozzle openings each having diameters smaller than the diameter of their respective port, wherein, in a first axial position of the member the second nozzle opening is in engagement with and at least substantially obstructed by the second surface, the engagement fluidly sealing the second nozzle opening, and the first nozzle opening is at least substantially unobstructed by the first surface, and in a second axial position of the member the first nozzle opening is in engagement with and at least substantially obstructed by the first surface, the engagement fluidly sealing the first nozzle opening, and the second nozzle opening is at least substantially unobstructed by the second surface; and
a piezoelectric actuator configured to move the member relative to the valve housing, between said first and second axial positions.

2. The servo valve of claim 1, wherein the piezoelectric actuator comprises a piezoelectric stack and a frame, the piezoelectric stack is attached to the frame at a first pair of opposed attachment points arranged perpendicular to the axis (X), and the member and the valve housing are attached to the frame at a second pair of opposed attachment points, and a separation between the first pair of attachment points is greater than a separation between the second pair of attachment points.

3. The servo valve of claim 1, wherein the actuator is arranged outside the valve housing and secured to the valve housing at an axial end thereof by a bracket.

4. The servo valve of claim 3, further comprising:
a cover secured to the valve housing and comprising an axially-extending portion extending axially beyond the piezoelectric actuator and a radially-extending portion.

5. The servo valve of claim 4, further comprising:
an electrical connection extending from the piezoelectric actuator and through an opening in the cover, the electrical connection configured for connection to an external power source; and
a seal disposed proximate the opening to sealingly engage the electrical connection and the cover.

6. The servo valve of claim 1, wherein the cavity defines a cross-section with a constant radial size and the first and second sections of the member are slideably engaged to the valve housing within the cavity.

7. The servo valve of claim 6, wherein the cavity cross-section and the first and second cross-sectional areas of the first and second sections are circular.

8. The servo valve of claim 1, further comprising:
an O-ring seal disposed around the second section of the member to sealingly engage the member and the valve housing.

9. The servo valve of claim 1, wherein one or more of the ports includes a screen filter.

10. The servo valve of claim 1, wherein the valve is a fuel supply valve.

11. The servo valve of claim 1, wherein the valve is a pneumatic control valve.

12. The servo valve of claim 1, wherein the plurality of ports extend substantially perpendicularly to the longitudinal axis (X) and/or extend parallel to each other.

13. The servo valve of claim 1, wherein the plurality of ports comprises a third port located axially between the first and second ports.

14. The servo valve of claim 1, further comprising:
a spool in fluid communication with at least one of the plurality of ports for controlling fluid flow to a component.

15. An assembly comprising:
the servo valve of claim 1, wherein the plurality of ports comprises a third port located axially between the first and second ports;
a spool in fluid communication with at least one of the plurality of ports; and
a component in fluid communication with the spool.

16. A method of repairing a valve system comprising:
removing an existing servo valve;
fitting the servo valve of claim 1.

* * * * *